3,382,164
SEPARATION OF CESIUM AND STRONTIUM BY ELECTRODIALYSIS

William H. Webb, Harry C. Hershey, and Ronald D. Mitchell, Rolla, Mo., assignors to the United States of America as represented by the United States Atomic Energy Commission
No Drawing. Filed Jan. 26, 1965, Ser. No. 428,260
2 Claims. (Cl. 204—180)

This invention relates to the separation of fission products produced during operation of a nuclear reactor. In more detail the invention relates to a method of separating cesium values from strontium values obtained from a waste solution resulting from the operation of a nuclear reactor.

Irradiated reactor fuel elements are normally processed by dissolving the fuel element in an acidic medium and subjecting the solution to solvent extraction to recover the fissionable materials. A waste solution containing the fission products is obtained as a by-product of this process.

There have been many suggestions for the disposal of this waste solution. Obviously, separation of individual elements from the mixture of fission products is a desirable solution to this problem since the radioactive isotopes are useful as tracers, in medical work, as sources of radiation and for other uses. It is known that electrodialysis can be employed to separate at least certain of the fission products from other fission products and U.S. Patent No. 3,038,844 describes a method and apparatus for accomplishing this purpose. Electrodialysis consists of the migration of cations and anions through ion exchange membranes under an applied potential. Ion exchange membranes are thin sheets of either cation or anion exchange resins bound to an inert plastic matrix and are, therefore, selective to the migration of cations and anions. If the process of this patent is employed, however, it is found that cesium and strontium migrate to the same electrode since both of these elements have the same ionic form throughout this process.

It is accordingly an object of the present invention to separate cesium values from strontium values.

It is a more detailed object of the present invention to supplement the method of the above-identified patent by separating cesium values from strontium values in a waste solution obtained as a result of operation of that method.

These and other objects of the present invention are attained by adding a chelating agent selected from the group consisting of ethylenediaminetetraacetic acid (EDTA) and diethylenetriaminepentaacetic acid (DTPA) to an alkaline waste solution containing cesium values and strontium values having a pH of 11 and subjecting the solution to electrodialysis through an anion exchange membrane.

To accomplish the separation of cesium values from strontium values by electrodialysis the ionic charge in solution of either cesium or strontium must be changed. This is accomplished by adding a chelating agent which forms a strong complex with one of the cations and does not form a complex with the other cation. According to the present invention, EDTA or DTPA is employed to complex the $Sr^{++}$ cation in accordance with the following reactions $$(Sr)^{2+} + (Y)^{4-} \rightarrow (SrY)^{2-}$$

where Y is EDTA with the four replaceable hydrogens removed and $$(Sr)^{2+} + (Y)^{5-} \rightarrow (SrY)^{3-}$$

where Y is DTPA with the five replaceable hydrogens removed. EDTA and DTPA do not form a complex with cesium.

Sodium hydroxide is employed to alkalize the feed solution to a pH of 11. A pH of 11 is optimum for the process because in strongly basic solution the mobile hydroxide ions transfer through the membranes instead of the less mobile chelate ion. Below a pH of 11, the concentration of free strontium ions becomes significant.

The anion permselective membrane is formed of an ion exchange resin such as Permutit 3148 which is a basic exchange resin of the polystyrene type incorporating quaternary ammonium functional groups. Other anion exchange membranes which are selective to the migration of anions can also be employed.

The following examples show the effectiveness of the present method. These studies were performed with two and three cell electrodialyzers as described by Bub and Webb, Rev. Sci. Inst. 32, No. 7, 857 (1961) and Bub, Vie, and Webb, I. and E. C. Process Design and Development, 1, 225 (1962). In the two-cell electrodialyzer, the cathode cell, which serves as feed cell, was separated from the anode cell by an anion exchange membrane (Permutit 3148). In the three-cell unit, the center feed cell was separated from the anode and cathode cells by membranes of the same material. The membrane area of the two-cell unit was 41.8 cm.$^2$ and that of the three-cell unit was 20.3 cm.$^2$. The contents of the two-cell electrodialyzer were continuously recycled by a positive displacement pump while the temperature in the three-cell unit was controlled by passing cold water over the exterior surface with no recycling.

A solution containing $1.1 \times 10^{-5}$ moles per liter of natural strontium as carrier and 140,000 counts per second of radiostrontium in 150 ml. was prepared. This solution was alkalized with NaOH to a pH of 11, the chelating agent added and the electrodialysis experiment performed in the two-cell unit using 150 ml. of solution as given in Table I. Then a solution containing $7.3 \times 10^{-6}$ moles per liter of natural cesium as carrier and 100,000 counts per second of radiocesium in 150 ml. was prepared. This solution was alkalized with NaOH to a pH of 11, the chelating agent added and the electrodialysis experiment performed in the two-cell unit using 150 ml. of solution as given in Table I. Cells other than the feed cell were filled initially with 0.5 molar sodium hydroxide.

TABLE I

| | Experiment Number | | | |
|---|---|---|---|---|
| | 1 | 2 | 3 | 4 |
| Chelating agent [1] | EDTA | EDTA | DTPA | DTPA |
| Tracer isotope | Sr-90 | Cs-137 | Sr-90 | Cs-137 |
| Current density, ma./cm.$^2$ | 11.9 | 19.0 | 19.0 | 21.4 |
| Electrodialysis time, min | 120 | 120 | 120 | 120 |
| Initial pH | 10.8 | 11.0 | 11.0 | 11.0 |
| Final pH | 12.1 | 12.6 | 12.6 | 12.6 |
| Final anode activity [2] | 74.9 | 0.0 | 46.7 | 0.0 |
| Final feed activity [2] | 4.3 | 97.5 | 20.4 | 99.0 |

[1] Chelate concentration was 0.0033 molar in all experiments.
[2] Percent of initial feed solution activity.

In the three-cell unit the concentration of carrier strontium and cesium were $3.4 \times 10^{-7}$ moles per liter and $2.2 \times 10^{-7}$ moles per liter, respectively, and the approximate activities used in the initial feed solution were 35,000 counts per second for the strontium tracer and 22,000 counts per second for the cesium tracer in a volume of 33 ml. The solutions were then alkalized with NaOH to a pH of 11, the chelating agent added, and the electrodialysis experiment performed as given in Table II.

TABLE II

| Chelating agent [1] | Experiment Number | | | |
|---|---|---|---|---|
| | 1 | 2 | 3 | 4 |
| Chelating agent [1] | EDTA | EDTA | EDTA | EDTA |
| Membrane type | Anion | Anion | Cation | Cation |
| Tracer isotope | Sr-90 | Cs-137 | Sr-90 | Cs-137 |
| Current density, ma./cm.[2] | 14.8 | 19.7 | 27.1 | 41.0 |
| Electrodialysis time, min | 60 | 60 | 90 | 90 |
| Initial pH | 11.0 | 11.0 | 11.0 | 11.0 |
| Final pH | 11.4 | 11.8 | 12.1 | 12.1 |
| Final anode activity [2] | 85.5 | 2.2 | 0.0 | 1.7 |
| Final feed activity [2] | 2.7 | 94.4 | 75.1 | 1.7 |
| Final cathode activity [2] | 0.4 | 3.4 | 11.3 | 81.5 |

[1] Chelate concentration was 0.005 molar in all experiments.
[2] Percent of initial feed solution activity.

Thus use of these anion exchange membranes results in quantitative separation of strontium from cesium in the two-cell electrodialyzer and in excellent separation in the three-cell electrodialyzer. EDTA provides better separation than DTPA under the specific conditions used in these experiments.

Cation exchange resins are not effective in separating cesium values from strontium values. Using the two-cell electrodialyzer with a cation exchange membrane, the pH of the feed solution dropped to less than 7.0 where both cesium and strontium exist primarily as uncomplexed cations. The feed solution pH dropped rapidly because the sodium cations in the feed solution transferred freely to the cathode cell and were replaced in the feed cell by hydrogen ions formed at the anode. Thus effective separation is not possible. Using the three-cell electrodialyzer with two cation exchange membranes it was found that 75% of the strontium was retained in the feed cell while 11% of the strontium transferred to the cathode cell with 81% of the cesium. It is thus concluded that cation exchange membranes are unsatisfactory.

While EDTA provided better separation than DTPA under the specific experimental conditions used in the experiments, it is evident from the tables that both are satisfactory.

It will be understood that the invention is not to be limited to the details given herein but that it may be modified within the scope of the appended claims.

What is claimed is:

1. A method for separating cesium values from strontium values in a conductive aqueous solution comprising adding a chelating compound capable of complexing one of these elements in an ion of opposite sign from that in which it was originally present, and subjecting the solution to electrodialysis.

2. A method of separating cesium values from strontium values in a conductive aqueous solution comprising adding NaOH to make the pH of the solution about 11, adding a chelating compound selected from the group consisting of EDTA and DTPA and subjecting it to electrodialysis through an anion exchange membrane.

References Cited

UNITED STATES PATENTS

| 3,025,224 | 3/1962 | Kepes | 204—1 |
| 3,038,844 | 6/1962 | Webb et al. | 204—180 |
| 3,062,731 | 11/1962 | Durrum | 204—180 |

OTHER REFERENCES

Reprint: Electrodialysis Unit for Fission Product Separation, The Review of Scientific Instruments, 32, No. 7, 857 (1961).

Reprint: Fractionation of Fission Elements by Electrodialysis, I&EC Process Design and Development, I, 225 (1962).

JOHN H. MACK, *Primary Examiner.*

ARTHUR C. PRESCOTT, *Assistant Examiner.*